W. O. NELSON.
SPEED INDICATOR FOR CREAM SEPARATORS.
APPLICATION FILED FEB. 19, 1915.

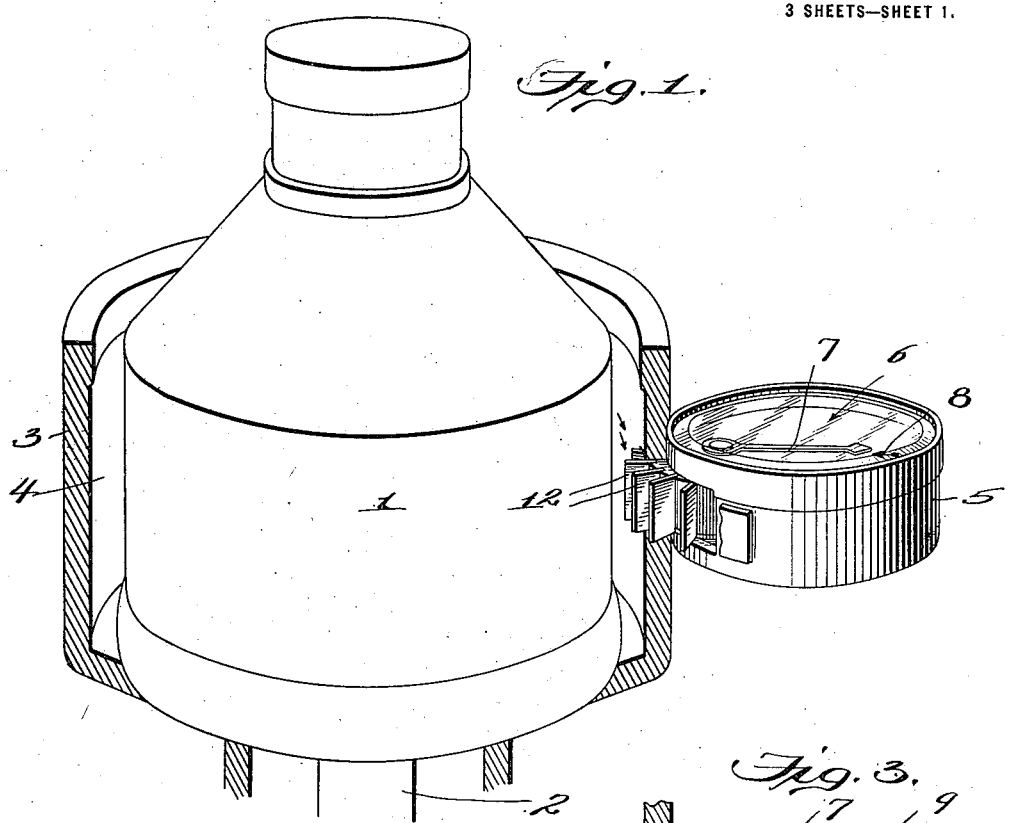

1,162,707.

Patented Nov. 30, 1915.
3 SHEETS—SHEET 2.

Witnesses:

Inventor
William O. Nelson
by
Attorney

W. O. NELSON.
SPEED INDICATOR FOR CREAM SEPARATORS.
APPLICATION FILED FEB. 19, 1915.
1,162,707.
Patented Nov. 30, 1915.
3 SHEETS—SHEET 3.
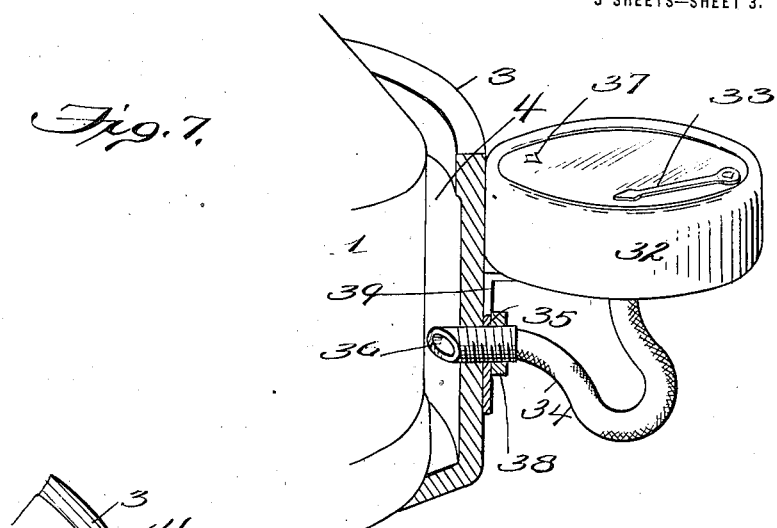
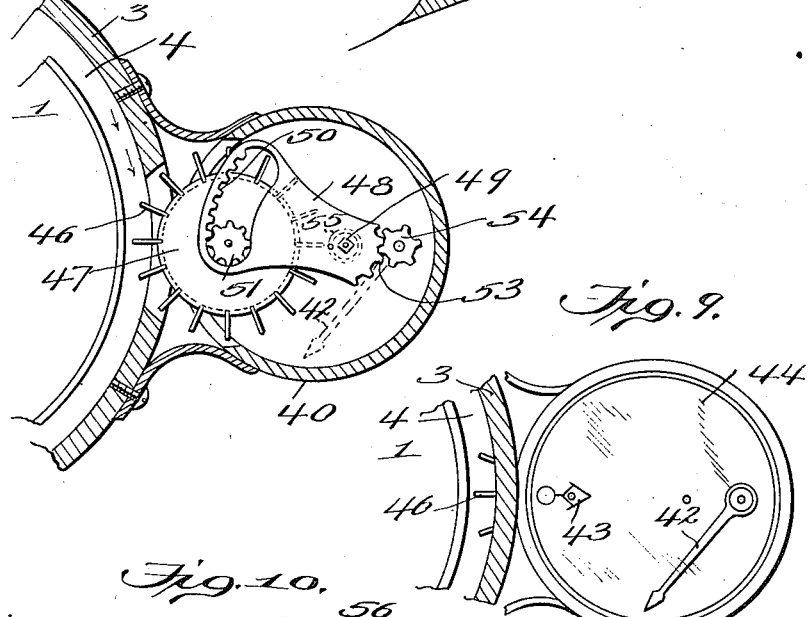
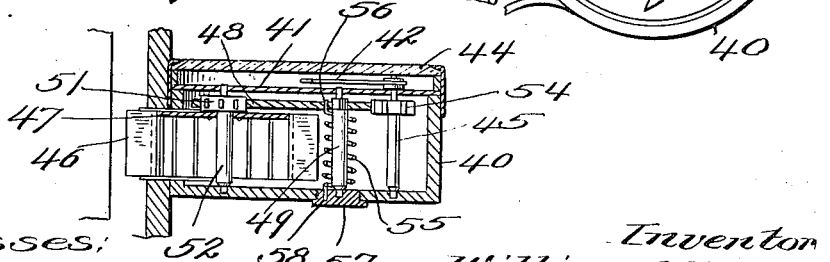
Witnesses:
Inventor
William O. Nelson
Attorney … (continued)

UNITED STATES PATENT OFFICE.

WILLIAM O. NELSON, OF TROY, OHIO.

SPEED-INDICATOR FOR CREAM-SEPARATORS.

1,162,707.  Specification of Letters Patent.  Patented Nov. 30, 1915.

Application filed February 19, 1915. Serial No. 9,377.

*To all whom it may concern:*

Be it known that I, WILLIAM O. NELSON, a citizen of the United States, residing at Troy, in the county of Miami and State of Ohio, have invented new and useful Improvements in Speed-Indicators for Cream-Separators, of which the following is a specification.

My present invention relates to improvements in speed indicators and it is especially applicable to cream separators to facilitate the maintenance of the proper speed to secure economy and efficiency in the operation thereof.

The primary objects of the invention are to provide a speed indicator for such purposes which shall be accurate and reliable, simple and inexpensive, not liable to derangement, one which will not require additional effort on the part of the attendant in operating the separator, and which can be applied at small cost to all cream separators as usually constructed without requiring change or alteration in the mechanism thereof.

To these and other ends, the invention consists in certain improvements, and combinations and arrangements of parts, all as will be hereinafter more fully described, the novel features being pointed out particularly in the claims at the end of the specification.

Figure 4:
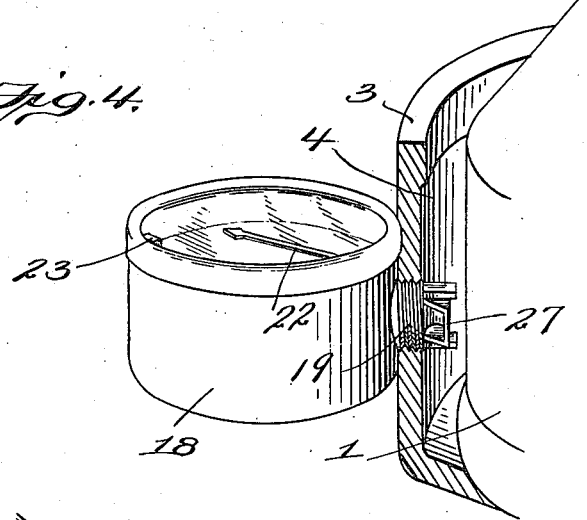
Figure 5:
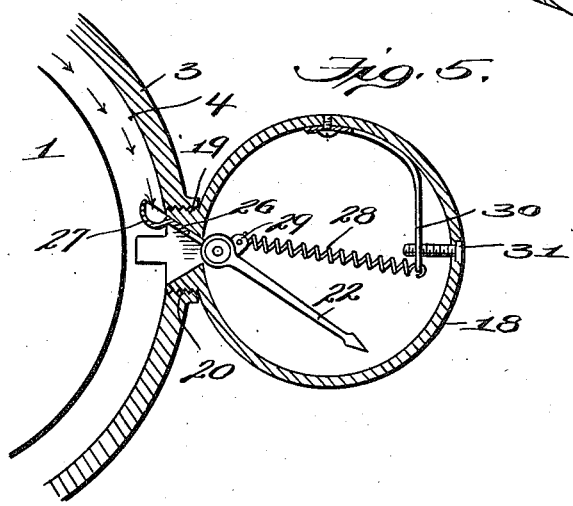
Figure 6:
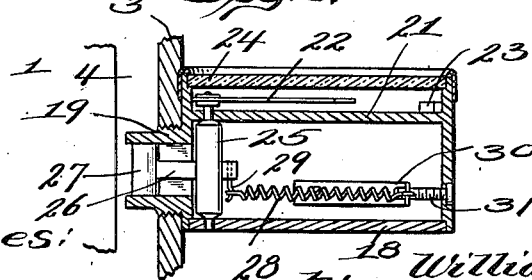

In the accompanying drawings:—Figure 1 is a perspective view, partly in section, showing a portion of a cream separator equipped with a speed indicator constructed in accordance with one embodiment of the present invention; Fig. 2 is a top plan view, partly in section, of the structure shown in Fig. 1; Fig. 3 represents a vertical section through the speed indicator; Fig. 4 is a detail perspective view showing another embodiment of the invention; Figs. 5 and 6 represent horizontal and vertical sections of the instrument and the adjacent portion of the separator, and illustrating in detail the construction of the indicator shown in Fig. 4; Fig. 7 in a detail perspective view showing another embodiment of the invention; Fig. 8 represents a horizontal section of a further embodiment of the invention; Figs. 9 and 10 represent a top plan and a vertical section, respectively, of the instrument shown in Fig. 8.

Similar parts are designated by the same reference characters in the several views.

In the operation of centrifugal cream separators, it is essential, in order to secure economy and efficiency, to maintain the speed of revolution of the separator bowl at a predetermined fixed point. For example, if the speed of revolution of the separator bowl is below a predetermined point, the cream is not thoroughly or completely separated from the relatively heavier or watery portion of the milk and, consequently, a portion of the cream will be carried off with the skimmed milk; thus reducing the amount of yield of cream, and if, on the other hand, the speed of revolution of the separator bowl is above a predetermined limit, some of the fat globules are broken or disintegrated, thus producing a constituent in the cream which is unsuitable for the making of butter.

The present invention provides a speed indicator which enables the separator bowl to be revolved at such a predetermined constant speed as will secure the maximum efficiency and economy in the operation of the separator.

The invention may be embodied in different forms of devices in carrying the same into effect, several embodiments of the invention being shown as examples in the present instance. It will therefore be understood that the claims at the end of the specification are intended to cover all equivalents of those shown in the drawing and hereinafter described in detail.

In the present instance the invention is shown applied to a centrifugal cream separator of the usual or well-known type, it embodying a separator bowl 1 which is mounted on the spindle 2 which spindle is connected to appropriate mechanism for revolving the bowl, and the bowl is surrounded by a casing or housing 3, this casing usually forming a circular wall which is concentric with the axis of the bowl and forms therewith an annular chamber or passage 4. In the operation of cream separators of this and similar types, the rotation of the separator bowl at comparatively high speed induces the flow of a current of air circularly around the annular space or passage 4 between the bowl and the surrounding casing, this flow of air being induced primarily by friction between the body of air in the annular chamber and the exterior surface of the revolving bowl. According to the present invention I utilize this revolving current of air as a medium which, acting upon an appropriate instrument responsive thereto, indicates the speed of revolution of the bowl.

In that embodiment of the invention shown in Figs. 1–3 inclusive, the instrument comprises a suitable casing 5 which is preferably fastened by suitable means to the exterior of the casing 3, the instrument having a dial 6, a pointer or indicator 7 on the face of the dial, an appropriate mark 8 with which the pointer is adapted to coöperate, and the dial and pointer are covered and protected by a glass or crystal 9. The pointer 7 is fixed to a pivot or shaft 10 which latter is journaled to rotate freely within the casing, and a member 11 is fixed to the shaft 10 and is provided on the side next to the separator with a plurality of vanes 12. These vanes 12 are preferably arranged concentrically and radially with respect to the axis or pivot 10 and they project through an opening 13 in the wall of the casing 3 into the annular space or passage 4 around which the current of air circulates during rotation of the separator bowl. The vanes 12 are preferably of equal radial length and the different vanes are brought into position to be acted on by the circulating current of air as the member 11 rotates about the pivot or shaft 10. A tension spring 14 is provided to normally hold the pointer at or toward one side of the index or mark 8, and to exert sufficient resistance to the movement of the pointer toward the index mark. In the construction shown, means is provided for adjusting the strength of the spring, one end of the spring being attached to a pin 15 on the member 11 at one side of the pivot or shaft 10, while the opposite end of the spring is attached to a screw 16, the latter extending through the wall of the casing and having a nut 17 on its outer end which abuts against the exterior wall of the casing. By turning the nut 17 in the appropriate direction axial movement is imparted to the screw 16, which movement will serve to increase or diminish the strength of the spring as may be required. It is preferable to initially set the instrument by revolving the separator bowl at the proper predetermined speed and then adjusting the spring to bring the pointer 7 in register with the index mark 8, and the attendant in operating the machine will run it so as to keep the pointer in register with the index mark.

In the operation of the separator, the bowl is revolved at comparatively high speed in, for example, the direction indicated by the arrow in Fig. 2, the frictional contact between the exterior wall of the bowl and the body of air contained in the annular passage or space 4 inducing a circulation or flow of such air circularly and in the direction of rotation of the bowl, and the velocity of this current of air will be in proportion to the speed of revolution of the bowl. The vanes 12 projecting into the chamber or passage 4 and consequently in the path of the current of air offer abutments upon which the current of air acts, producing a pressure upon those sides of the vanes facing the current of air, which pressure is proportionate to the velocity of the current of air and in consequence is proportionate to the speed of revolution of the separator bowl. This pressure on the vanes 12 acts in opposition to the resistance offered by the spring 14 to move the pointer 7 toward a position in register with the index mark 8, the extent of movement of the pointer in such direction being proportionate to the speed of revolution of the separator bowl, and when the separator bowl is driven up to a predetermined speed, the pointer will register with the index mark. By adjusting the instrument so that the pointer registers with the index mark when the separator bowl is driven at the most efficient and economical speed, the operator by observing the dial of the instrument may maintain the speed of the separator at such predetermined point, any tendency to diminish the speed resulting in a movement of the pointer toward one side of the index mark, and any tendency toward an increase in speed causing the pointer to move toward the opposite side of the index mark.

In that embodiment of the invention shown in Figs. 4–6 inclusive, a somewhat different form of instrument is shown applied to the same type of separator embodying the separator bowl 1, the surrounding casing 3, and the annular chamber or passage 4 between the bowl and casing. The instrument in this instance comprises a casing 18 which may be provided, as shown, with a nipple 19 adapted to be threaded into an opening 20 formed in the wall 3 of the casing. The instrument embodies a suitable dial 21, a movable pointer 22, a relatively fixed index mark 23 to coöperate with the pointer, and a glass cover 24 for the dial, pointer and index mark. The pointer is fixed to a shaft 25 which is journaled in the casing, and a vane 26 is fixed to the shaft or pivot 25, the vane in this form of the invention being cupped or having a pocket or depression 27 the opening in which faces the current of air circulating in the chamber or passage 4. This single vane may have either a plane surface, or it may be pocketed or cupped, and may be used in place of the multiple vanes 12 shown and described in the preceding embodiment of the invention, it being somewhat simpler than the former construction, and in using a cupped or pocketed vane, a steadier action of the pointer 22 to which it is connected is obtained. The movement of the pointer 22 in response to the action of the current of air on the cupped vane is resisted to an appropriate degree by a spring or equivalent device 28, the spring shown being connected at one end to a lug or arm 29 attached to the pivot 25 at one side of its axis, and the opposite end of the spring being connected to a spring 30 which is operatively connected to an adjusting screw 31, turning of the screw varying the strength of the spring 28 as may be required to secure proper adjustment of the pointer 22.

In that embodiment of the invention shown in Fig. 7, a somewhat different form of indicator is shown applied to a separator embodying the revoluble separator bowl 1, the outer or surrounding casing 3, and the intermediate annular chamber or passage 4 in which the body of air circulates. In this instance, an indicator 32 is shown which is of a type wherein the pointer 33 is responsive to variations in pressure of a fluid entering the indicator by a tube or conduit 34. For example, this indicator may be of the diaphragm type shown and described in my prior Patent, No. 1,090,938, granted March 24, 1914. In this instance, the tube or conduit 34 is connected to a member 35 which projects through the wall 3 of the outer casing and is provided with an opening which faces the current of air circulating in the annular space or chamber 4 whereby such air current will develop a pressure at the opening in the member 35 and such pressure will be transmitted through the column of fluid in the tube or conduit 34 to the instrument 32. The member 35 may be constructed in different ways. In the present instance it has an axial bore, and the inner end of the member is beveled or cut diagonally to provide an opening 36 which leads to said bore and is subject to the action of the current of air revolving within the annular chamber 4. Preferably, means is provided for adjusting the instrument so that its pointer 33 will register with the index mark 37 when the separator is driven at the desired predetermined speed. In the present instance this is accomplished by threading the member 35 into the wall 3 of the outer casing whereby it may be rotated to alter the position of the opening 36 therein and thus vary the effectiveness of the action of the current of air thereon. The member 35 is secured in the proper adjusted position by a lock nut or other suitable device 38, and in the construction shown, this lock nut and member 35 serve to secure in position a bracket 39 which supports the instrument 32 on the exterior of the outer casing 3. It is obvious, however, that the instrument 32 can be placed at any desired point removed from the separator, it being only necessary to extend the tube or conduit 34 from the separator to the indicator.

In the construction shown in Figs. 8-10 inclusive, another form of indicator is shown in connection with a separator having the revoluble bowl 1, the outer stationary casing 3, and the interposed annular chamber or passage 4 in which the air circulates. In this instance the instrument comprises a casing 40 which is suitably secured preferably to the exterior of the stationary casing 3 and contains a dial 41, a movable pointer 42, and an index mark 43, such parts being covered and protected by a glass 44. The pointer 42 is fixed to a pivot or shaft 45 which latter is suitably journaled in the casing, and the current of air flowing circularly around the chamber or passage 4 acts in this instance upon the vanes 46 of a member 47, the member 47 being preferably circular and provided with a circumferential series of equi-distantly spaced and radially arranged vanes which, as the member 47 revolves, are brought successively into the passage 4 to be acted on by the current of air. Suitable means is interposed between the member 47 and the pointer 42 to secure the appropriate degree of movement of the pointer according to the extent of rotation of the member 47 under the influence of the circulating current of air, and also suitable means is provided for appropriately resisting the movement of the pointer. In the construction shown, a gear segment 48 is provided, it being fixed intermediately to a supporting pivot 49 and it has at one end an internal gear section 50 coöperative with a pinion 51 fixed to the shaft 52 of the member 47, while the opposite end of the segment 48 is provided with gear teeth 53 which coöperate with a pinion 54, the latter being fixed to the pivot or shaft 45 of the pointer. A spring 55 is provided and this spring acts to resist the movement of the pointer as well as rotation of the member 47 under the influence of the current of air acting on the vanes 46 thereof. In the construction shown, a coil spring is provided, one end of which is secured at 56 to the gear segment 48, and the opposite end of the spring is suitably held so as to maintain the spring under appropriate tension. In the present instance, a rotatable plug or bushing 57 is threaded or otherwise rotatably fitted in the casing 40 and has the opposite end of the spring 55 connected thereto at 58, rotation of the plug or bushing serving to adjust the strength of the spring which acts to oppose rotation of the member 47 and consequent movement of the pointer under the influence of the circulating current of air in the annular chamber 4. The spring in this embodiment of the invention is also preferably adjusted to bring the pointer into register with the index mark 43 when the separator is running at the predetermined selected speed as in the other embodiments of the invention.

I claim as my invention:—

1. The combination of relatively revoluble members having radially spaced, smooth-surfaced walls forming an annular space between them for the circulation of a current of fluid, and an instrument acted on by and responsive to such current of fluid to indicate the relative speed of rotation between said members.

2. In a cream separator, a device for indicating the speed of revolution of the bowl thereof in accordance with the velocity of the current of air surrounding the separator bowl.

3. In a cream separator, a device responsive to the action of the current of air surrounding the separator bowl for indicating the speed of revolution of the latter.

4. The combination with the revoluble separator bowl and the outer casing of a separator, said bowl and casing forming an annular space between them for the circulation of a current of air, of an instrument responsive to the action of such current of air to indicate the speed of revolution of the bowl.

5. A device for indicating the speed of revolution of separators comprising a speed indicating element responsive to the action of the current of air circulating between the bowl and its outer casing.

6. A device for indicating the speed of revolution of the separator bowl of a separator, comprising a speed indicating element, and a medium subject to the action of the body of air circulating between the bowl and outer casing of the separator and operative on said indicating element to indicate the speed of revolution of the bowl in accordance with the velocity of said circulating body of air.

7. In a cream separator, a device responsive to the action of the current of air surrounding the separator bowl for indicating the speed of revolution of the bowl and embodying an indicator element, an index mark to coöperate therewith, and means for adjusting the device to bring said indicator element and index mark into a given relation when the separator bowl revolves at a predetermined speed.

8. In a cream separator, a device acted on by and responsive to the action of the current of air surrounding the separator bowl for indicating the speed of revolution of the bowl and embodying means for varying the degree of response of such device to such current.

9. A device for indicating the speed of revolution of the separator bowl of a separator, comprising a speed indicating element, and a vane acted on by the current of air surrounding the bowl and operative on said element to indicate the speed of the bowl.

10. A device for indicating the speed of revolution of the separator bowl of a separator, comprising a speed indicating element, a vane acted on by the current of air surrounding the bowl and operative on said element to indicate the speed of the bowl, and an element acting to resist movement of said vane under the influence of said current, said element having means for varying such resistance.

In testimony whereof I have hereunto set my hand in presence of two subscribing witnesses.

WILLIAM O. NELSON.

Witnesses:
 DAVID C. GREEN,
 H. M. RUCK.